(12) United States Patent
Jacob et al.

(10) Patent No.: US 11,167,856 B2
(45) Date of Patent: Nov. 9, 2021

(54) MULTILAYER STRUCTURE WITH CARBON NANOTUBE HEATERS

(71) Applicant: Goodrich Corporation, Charlotte, NC (US)

(72) Inventors: Robin Jacob, Bangalore (IN); Guru Prasad Mahapatra, Karnataka (IN)

(73) Assignee: GOODRICH CORPORATION OF CHARLOTTE, NC, Charlotte, NC (US)

( * ) Notice: Subject to any disclaimer, the term of this patent is extended or adjusted under 35 U.S.C. 154(b) by 185 days.

(21) Appl. No.: 16/274,366

(22) Filed: Feb. 13, 2019

(65) Prior Publication Data
US 2020/0189751 A1   Jun. 18, 2020

(30) Foreign Application Priority Data
Dec. 13, 2018 (IN) .............................. 201811047213

(51) Int. Cl.
*B64D 15/12* (2006.01)
*H05B 3/14* (2006.01)

(52) U.S. Cl.
CPC ............. *B64D 15/12* (2013.01); *H05B 3/145* (2013.01); *H05B 3/146* (2013.01);
(Continued)

(58) Field of Classification Search
CPC ........ B64D 15/12; H05B 3/145; H05B 3/146; H05B 3/265; H05B 3/06; H05B 3/26;
(Continued)

(56) References Cited

U.S. PATENT DOCUMENTS 8,481,898 B2   7/2013 Parker
8,496,854 B2   7/2013 Mercx et al.
(Continued)

FOREIGN PATENT DOCUMENTS

CN   207117981 U    3/2018
EP     3297395 A2    3/2018
(Continued)

OTHER PUBLICATIONS

Extended European Search Report issued in Application No. 19216042.2 dated Apr. 29, 2020, 7 pages.
(Continued)

*Primary Examiner* — Shawntina T Fuqua
(74) *Attorney, Agent, or Firm* — Cantor Colburn LLP

(57) ABSTRACT

Disclosed is a multilayer structure, comprising: a first heater layer comprising a CNT heater, wherein the CNT heater comprises a composite of carbon nanotubes and silicone; and a second heater layer comprising a PTC heater, wherein the PTC heater comprises a composite of carbon black and polymer; wherein the first heater layer and the second heater layer are first and second respectively in an electrical series; wherein the first heater layer has a negative temperature coefficient with respect to electrical resistivity; and wherein the second heater layer has a positive temperature coefficient with respect to electrical resistivity. Also disclosed is an aircraft component comprising the multilayer structure.

12 Claims, 4 Drawing Sheets

(52) U.S. Cl.
CPC ...... *H05B 2203/01* (2013.01); *H05B 2203/02* (2013.01); *H05B 2214/02* (2013.01); *H05B 2214/04* (2013.01)

(58) Field of Classification Search
CPC .. H05B 3/18; H05B 2203/01; H05B 2203/02; H05B 2203/019; H05B 2214/02; H05B 2214/04
See application file for complete search history.

(56) References Cited

U.S. PATENT DOCUMENTS

| | | | |
|---|---|---|---|
| 9,511,871 | B2 | 12/2016 | Steinwandel et al. |
| 9,668,301 | B2 | 5/2017 | Lim et al. |
| 2005/0218398 | A1 | 10/2005 | Tran |
| 2008/0142494 | A1* | 6/2008 | Blake ................. B60N 2/5685 219/217 |
| 2009/0194525 | A1 | 8/2009 | Lee et al. |
| 2014/0151353 | A1* | 6/2014 | Steinwandel .......... H05B 3/145 219/202 |
| 2016/0113063 | A1 | 4/2016 | O'Connor et al. |
| 2016/0374147 | A1* | 12/2016 | Song ...................... H05B 3/34 |
| 2018/0124874 | A1 | 5/2018 | Dardona et al. |
| 2018/0160482 | A1 | 6/2018 | Hartzler et al. |

FOREIGN PATENT DOCUMENTS

| | | |
|---|---|---|
| JP | 2011252946 A | 12/2011 |
| WO | 2010032017 A1 | 3/2010 |
| WO | 2014188190 A1 | 11/2014 |

OTHER PUBLICATIONS

Kunmo Chu et al., "Smart Conducting polymer composites having zero temperature coefficient of resistance", Electronic Supplementary Material (ESI) for Nanoscale, The Royal Society of Chemistry, 2014, 8 pages.

Kunmo Chu et al., "Smart conducting polymer composites having zero temperature coefficient of resistance", Nanoscale, vol. 7, 2015, 9 pages.

K. Chu, D. Kim, Y. Sohn, S. Lee, C. Moon, and S. Park, "Electrical and Thermal Properties of Carbon-Nanotube Composite for Flexible Electric Heating-Unit Applications," IEEE Electron Device Lett., vol. 34, No. 5, pp. 668-670, May 2013.

K. Chu, D.-J. Yun, D. Kim, H. Park, and S.-H. Park, "Study of electric heating effects on carbon nanotube polymer composites, "Organic Electron., vol. 15, No. 11, pp. 2734-2741, Nov. 2014.

* cited by examiner

MULTILAYER STRUCTURE WITH CARBON NANOTUBE HEATERS

BACKGROUND

Exemplary embodiments pertain to the art of carbon nanotube heaters, and more particularly, to multilayer structures comprising carbon nanotube heaters for use in aircraft.

Aircraft use electro-thermal heating technology in their wings to prevent icing. Carbon nanotube (CNT) heaters are a potential choice for aircraft application because they possess a high strength-to-weight ratio and a high power density. For example, CNT heaters can include a composite of carbon nanotubes and silicone. However, at high temperatures, the electro-thermal resistance of the carbon nanotube heaters decreases significantly (negative temperature coefficient), resulting in excessive power output and overheating of the wing.

In addition, wing de-icing systems often use a plurality of temperature sensors to monitor and control wing surface temperature. However, a temperature sensor can only monitor temperature in a single, localized position. Further, it is impractical to install temperature sensors across an entire surface of the wing. It becomes difficult to monitor or control wing temperature with such a system because temperature can vary in hot and cold spots across the surface of the wing. This temperature variation can then lead to overheating and failure of the system.

Therefore, there is a need to develop a strong and lightweight structure with CNT heaters for aircraft that can improve power output efficiency, regulate temperature across an entire wing surface, and prevent overheating.

BRIEF DESCRIPTION

Disclosed is a multilayer structure, comprising: a first heater layer comprising a CNT heater, wherein the CNT heater comprises a composite of carbon nanotubes and silicone; and a second heater layer comprising a PTC heater, wherein the PTC heater comprises a composite of carbon black and polymer; wherein the first heater layer and the second heater layer are first and second respectively in an electrical series; wherein the first heater layer has a negative temperature coefficient with respect to electrical resistivity; and wherein the second heater layer has a positive temperature coefficient with respect to electrical resistivity.

Also disclosed is an aircraft component comprising the multilayer structure.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
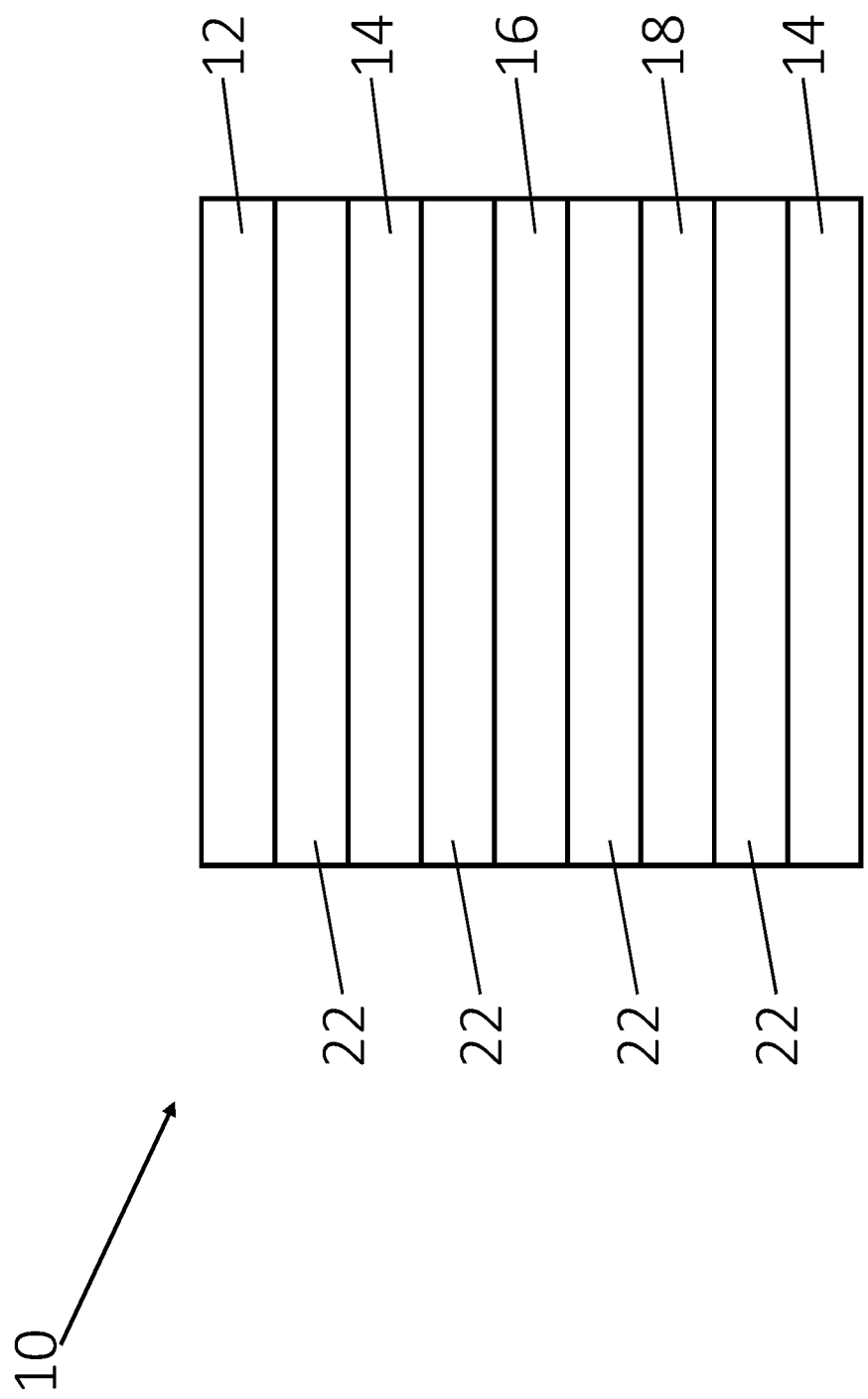
FIG. 1 is a cross-section of a multilayer structure according to an exemplary embodiment.

Referring to FIG. 1, a multilayer structure 10 includes a metal layer 12, adhesive layers 22, fiber glass layers 14, a first heater layer 16, and a second heater layer 18. The multilayer structure 10 can include additional layers, or fewer layers, than shown in FIG. 1. For example, the multilayer structure 10 can include additional adhesive layers 22 and additional fiber glass layers 14. The multilayer structure 10 can include layers arranged in the same order as shown in FIG. 1. Alternatively, the multilayer structure 10 can include layers arranged in a different order than shown in FIG. 1. For example, as shown in FIG. 1, the metal layer 12 can be located closer to the first heater layer 16 than to the second heater layer 18. Alternatively, the metal layer 12 can be located closer to the second heater layer 18 than to the first heater layer 16 (e.g., the position of the first heater layer 16 and the second heater layer 18, as shown in FIG. 1, can be switched).

Figure 4:
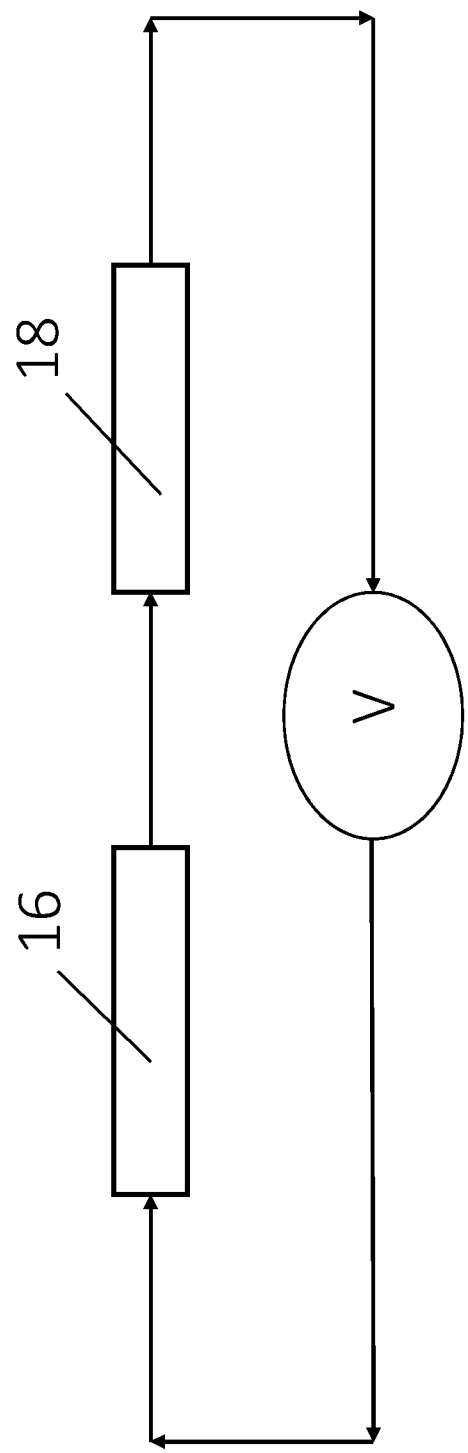
FIG. 4 is a series circuit schematic for a multilayer heater structure according to an exemplary embodiment.

Referring to FIG. 4, the first heater layer 16 and the second heater layer 18 can be first and second respectively in an electrical series. "V" denotes a voltage source. In other words, an electrical current can first be passed through the first heater layer 16 and then the electrical current can subsequently be passed through the second heater layer 18.

The first heater layer 16 can have a negative temperature coefficient with respect to electrical resistivity. In other words, as the temperature of the first heater layer 16 increases, the electrical conductance of the first heater layer 16 increases (i.e., electrical resistance decreases). The second heater layer 18 can have a positive temperature coefficient with respect to electrical resistivity. In other words, as the temperature of the second heater layer 18 increases, the electrical resistance of the second heater layer 18 increases (i.e., electrical conductance decreases).

When an electrical current is passed through the first heater layer 16, the temperature of the first heater layer 16 increases and therefore electrical resistance of the first heater layer 16 decreases. This results in increased thermal dissipation from the first heater layer 16. The electrical current then passes through the second heater layer 18 (next in the electrical series) causing the temperature of the second heater layer 18 to increase and therefore electrical resistance of the second heater layer 18 increases. Accordingly, at high temperatures, the electrical current coming from the first heater layer 16 will be dampened as is subsequently passes through second heater layer 18. The first heater layer 16 and the second heater layer 18 will therefore have a self-regulating relationship. The first heater layer 16 and the second heater layer 18 will balance and stabilize the temperature of the multilayer structure 10. This creates a self-regulating loop for the thermal output of the multilayer structure 10. For example, if temperature and power output from the first heater layer 16 are excessive, the second heater layer 18 (increased resistance) will compensate by dampening the electrical current in the loop, thereby reducing power to the first heater layer 16. This compensation effect results in a self-regulating system. Accordingly, the multilayer structure can address local hot and cold spots and maintain a homogenous temperature profile across the surface of an aircraft wing. The multilayer structure 10 is a strong and lightweight heater structure for aircraft that can improve power output efficiency, regulate temperature across an entire wing surface, and prevent overheating.

The first heater layer 16 can comprise a carbon nanotube (CNT) heater. For example, the CNT heater can comprise a composite of carbon nanotubes and silicone.

The second heater layer 18 can comprise a positive temperature coefficient (PTC) heater. For example, the PTC heater can comprise a composite of carbon black and polymer.

It is understood in the art that for a given temperature, electrical resistance of a composition can be varied by varying its components. For example, as you increase the percentage of carbon nanotubes in the first heart layer 16, the electrical resistance decreases for a given temperature (K. Chu, D. Kim, Y. Sohn, S. Lee, C. Moon, and S. Park, "Electrical and thermal properties of carbon-nanotube composite for flexible electric heating-unit applications," IEEE Electron Device Lett., vol. 34, no. 5, pp. 668-670, May 2013). Similarly, as you increase the percentage of carbon black in the second heater layer 18, the electrical resistance decreases for a given temperature (K. Chu, D.-J. Yun, D. Kim, H. Park, and S.-H. Park, "Study of electric heating effects on carbon nanotube polymer composites," Organic Electron., vol. 15, no. 11, pp. 2734-2741, November 2014.) Accordingly, it is understood that the electrical resistance of the first heater layer 16 and the second heater layer 18 can be varied as needed by a person of skill in the art for any given application.

The multilayer structure 10 can further comprise an adhesive layer 22, for example, greater than or equal to two adhesive layers 22. For example, the adhesive layer 22 can comprise a thermal conductor material, an electrical insulator material, or a combination comprising at least one of the foregoing. The adhesive layer 22 can bond adjacent layers together.

The multilayer structure 10 can further comprise a fiber glass layer 14, for example, greater than or equal to two fiber glass layers 14.

The multilayer structure 10 can further comprise a metal layer 12. For example, the metal layer 12 can comprise aluminum, steel, or a combination comprising at least one of the foregoing. The metal layer 12 can be an outer surface of the multilayer structure 10. For example, the metal layer 12 can be an outer surface of an aircraft component comprising the multilayer structure 10. For example, the aircraft component can be a wing of the aircraft.

EXAMPLES

Figure 2:
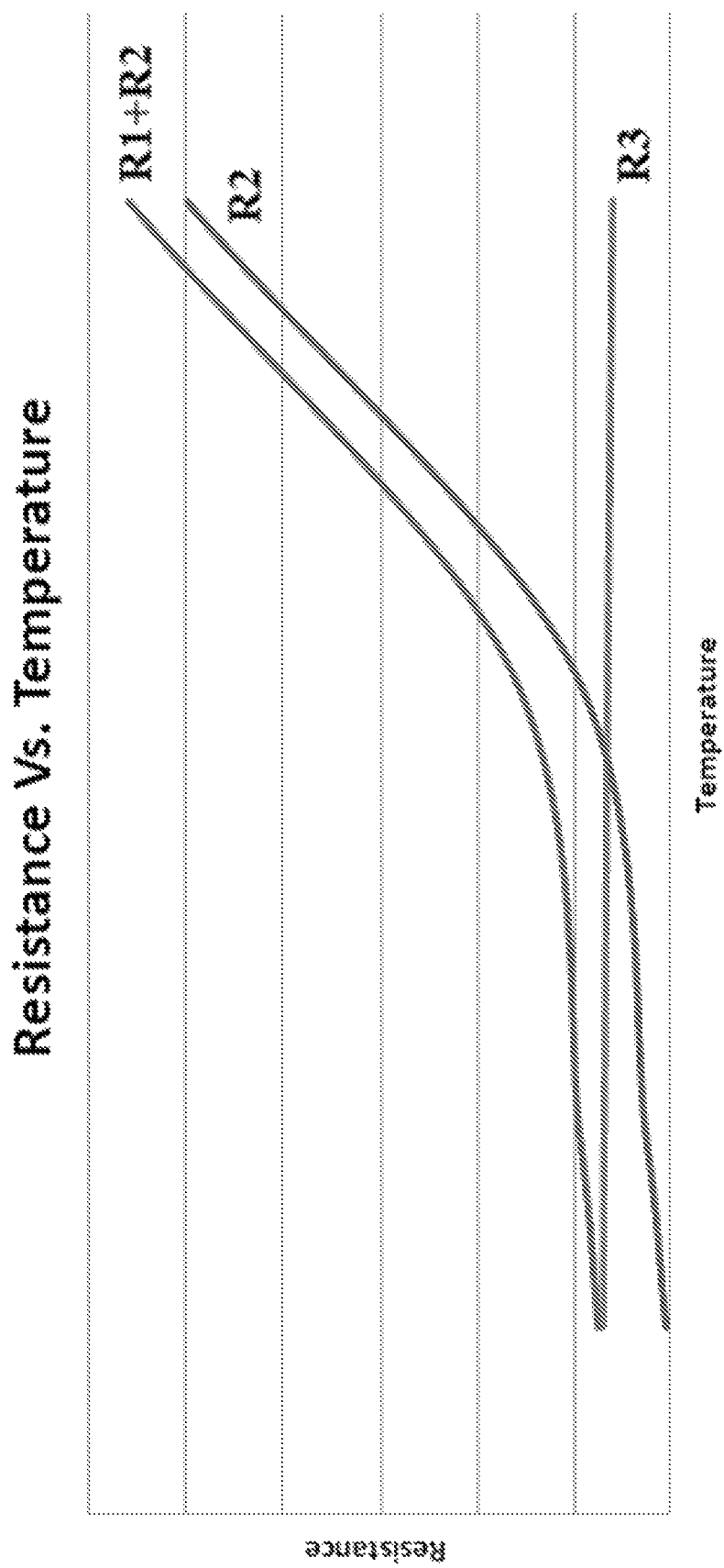
FIG. 2 is a line graph depicting resistance vs. temperature data for multilayer heater structures.
Figure 3:
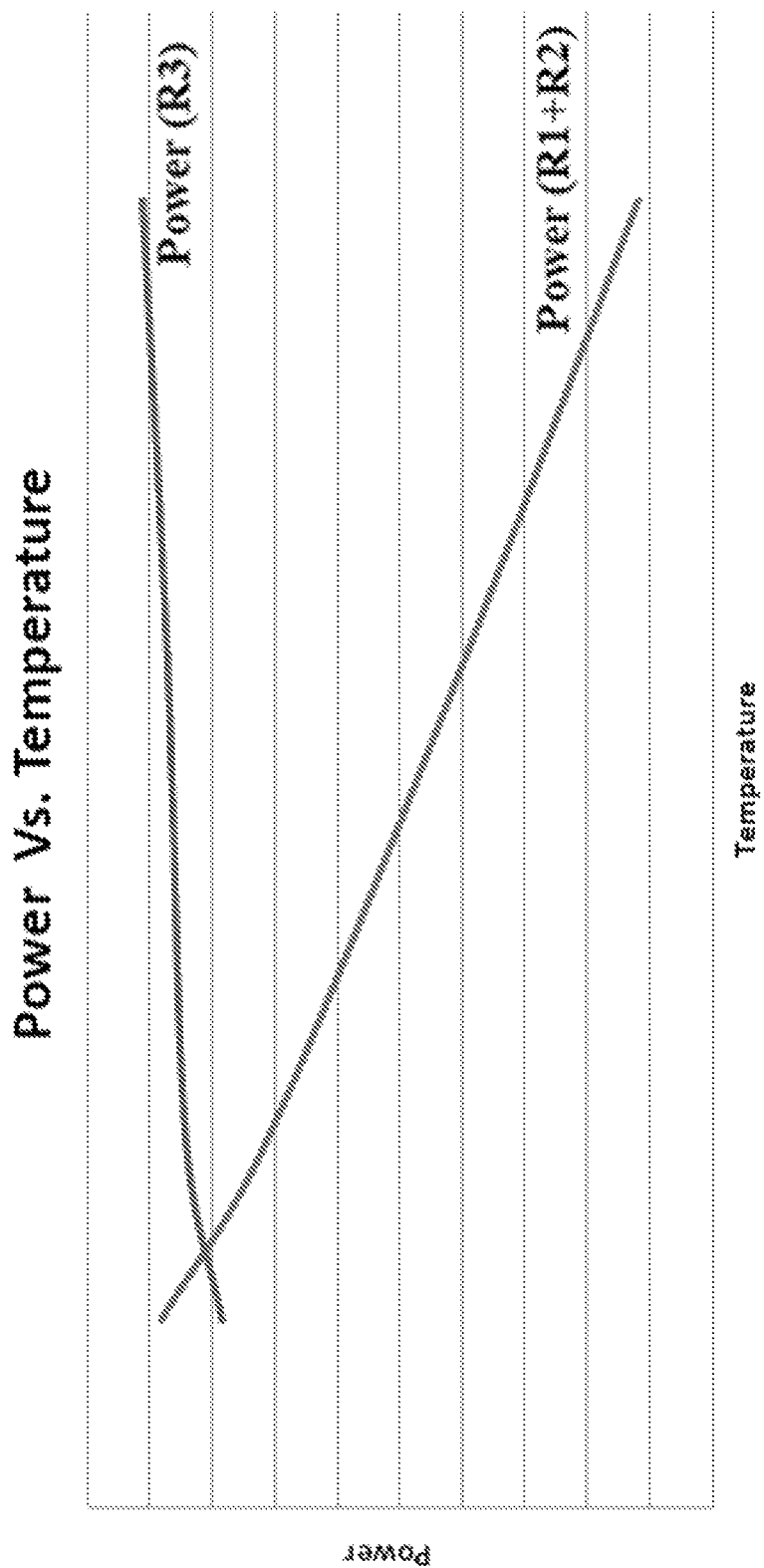
FIG. 3 is a line graph depicting power vs. temperature data for multilayer heater structures.

Referring to FIG. 2 and FIG. 3, properties of multilayer heater structures at varying temperatures (° C.) are presented. R1 is the resistance in ohms for the first heater layer 16 of the multilayer structure 10 as shown in FIG. 1. R2 is the resistance in ohms for the second heater layer 18 of the multilayer structure 10 as shown in FIG. 1. R1+R2 is the combined resistance in the electrical series for multilayer structure 10. R3 is the resistance of a separate, lone CNT heater comprising a composite of carbon nanotubes and silicone, tested for comparative purposes. The combined resistance in the electrical series (R1+R2) is less than or equal to R3 at lower temperatures as shown in FIG. 2. Power (R1+R2), as shown in FIG. 3, is the power (Watts) dissipated by the multilayer structure 10 as shown in FIG. 1.

As shown in FIG. 2 and FIG. 3, at higher temperatures, the average power dissipation of the multilayer structure 10 (R1+R2) is significantly lower than the lone heater R3. The second heater layer 18 (R2) aids in self-regulating maximum temperature and avoids overheating by increasing its resistance and thereby reducing the current. The multilayer structure 10 (R1+R2) is a strong and lightweight heater structure for aircraft that can improve power output efficiency, regulate temperature across an entire wing surface, and prevent overheating.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A multilayer structure, comprising:
a first heater layer comprising a CNT heater, wherein the CNT heater comprises a composite of carbon nanotubes and silicone; and
a second heater layer comprising a PTC heater, wherein the PTC heater comprises a composite of carbon black and polymer;
wherein the first heater layer and the second heater layer are first and second respectively in an electrical series;
wherein the first heater layer has a negative temperature coefficient with respect to electrical resistivity; and
wherein the second heater layer has a positive temperature coefficient with respect to electrical resistivity.

2. The multilayer structure of claim 1, further comprising an adhesive layer.

3. The multilayer structure of claim 1, further comprising greater than or equal to two adhesive layers.

4. The multilayer structure of claim 2, wherein the adhesive layer comprises a thermal conductor material, an electrical insulator material, or a combination comprising at least one of the foregoing.

5. The multilayer structure of claim 1, further comprising a metal layer.

6. The multilayer structure of claim 5, wherein the metal layer comprises aluminum, steel, or a combination comprising at least one of the foregoing.

7. The multilayer structure of claim 5, wherein the metal layer is an outer surface of the multilayer structure.

8. The multilayer structure of claim 7, wherein the metal layer is located closer to the first heater layer than to the second heater layer.

9. The multilayer structure of claim 1, further comprising a fiber glass layer.

10. The multilayer structure of claim 1, further comprising greater than or equal to two fiber glass layers.

11. An aircraft component comprising the multilayer structure of claim 1.

12. The aircraft component of claim 11, wherein the aircraft component is a wing of the aircraft.

* * * * *